United States Patent
Kim (10) Patent No.: US 10,919,521 B2
(45) Date of Patent: Feb. 16, 2021

(54) SMART PARKING ASSIST SYSTEM AND METHOD OF CONTROLLING THE SAME

(71) Applicant: MANDO CORPORATION, Gyeonggi-do (KR)

(72) Inventor: Jae Suk Kim, Gyeonggi-do (KR)

(73) Assignee: MANDO CORPORATION, Gyeonggi-do (KR)

(*) Notice: Subject to any disclaimer, the term of this patent is extended or adjusted under 35 U.S.C. 154(b) by 256 days.

(21) Appl. No.: 15/985,665

(22) Filed: May 21, 2018

(65) Prior Publication Data

US 2018/0339702 A1 Nov. 29, 2018

(30) Foreign Application Priority Data

May 23, 2017 (KR) .................. 10-2017-0063586

(51) Int. Cl.
G05D 1/00 (2006.01)
G05D 3/00 (2006.01)
(Continued)

(52) U.S. Cl.
CPC ......... B60W 30/06 (2013.01); G06K 9/00805 (2013.01); G06K 9/00812 (2013.01);
(Continued)

(58) Field of Classification Search
CPC ............. B60W 30/06; B60W 2554/00; B60W 2710/0666; B60W 2520/10; B60W 2510/0657; G06K 9/00812; G06K 9/00805

See application file for complete search history.

(56) References Cited

U.S. PATENT DOCUMENTS

2007/0282503 A1* 12/2007 Luke .................. B62D 15/0285
701/44
2009/0259365 A1* 10/2009 Rohlfs ................. B62D 15/028
701/41
(Continued)

FOREIGN PATENT DOCUMENTS

CN 105416277 3/2016
CN 105416278 3/2016
(Continued)

OTHER PUBLICATIONS

Office Action dated Nov. 2, 2020 for Chinese Application No. 201810499882.9 and its English machine translation by Google Translate.

Primary Examiner — Khoi H Tran
Assistant Examiner — Jorge O Peche
(74) Attorney, Agent, or Firm — Ladas & Parry, LLP (57) ABSTRACT

The present disclosure relates to a smart parking assist system (SPAS) and a method of controlling the smart parking assist system. The system and method detect an obstacle that is located on a path to a parking space for automatic parking and is not detected by a sensor of a vehicle using a target speed, a moving speed, and a driving torque of the vehicle, control the vehicle to pass over the obstacle according to a position of the detected obstacle, or change an automatic parking termination condition and complete the automatic parking, thereby detecting the obstacle even though the obstacle is not detected by a sensor in the process of controlling the automatic parking and completing the automatic parking.

13 Claims, 8 Drawing Sheets

(51) Int. Cl.
*G06F 7/00* (2006.01)
*B60W 30/06* (2006.01)
*G06K 9/00* (2006.01)

(52) U.S. Cl.
CPC . *B60W 2510/0657* (2013.01); *B60W 2520/10* (2013.01); *B60W 2554/00* (2020.02); *B60W 2710/0666* (2013.01)

(56) References Cited

U.S. PATENT DOCUMENTS

| | | | | |
|---|---|---|---|---|
| 2012/0173068 A1* | 7/2012 | Seiter | ................... | B60W 50/16 701/23 |
| 2014/0240502 A1* | 8/2014 | Strauss | .............. | B62D 15/0285 348/148 |
| 2015/0214751 A1* | 7/2015 | Niizuma | ................. | H02J 7/025 307/9.1 |
| 2016/0203377 A1* | 7/2016 | Irie | .................... | G06K 9/00798 348/118 |
| 2016/0272244 A1* | 9/2016 | Imai | ........................ | G08G 1/166 |
| 2016/0318551 A1* | 11/2016 | Terkes | ................. | B62D 15/028 |
| 2017/0028985 A1* | 2/2017 | Kiyokawa | ............. | G01S 15/876 |
| 2017/0032680 A1* | 2/2017 | Imai | ...................... | G06K 9/6293 |
| 2018/0022346 A1* | 1/2018 | Murakami | .............. | G08G 1/168 701/37 |
| 2018/0111610 A1* | 4/2018 | Romainczyk | ......... | B60W 50/14 |
| 2018/0170366 A1* | 6/2018 | Fukushima | .............. | B60R 21/00 |
| 2018/0244287 A1* | 8/2018 | Kirstein | ................. | B60W 30/06 |
| 2018/0334164 A1* | 11/2018 | Stefan | ..................... | G08G 1/143 |
| 2019/0047551 A1* | 2/2019 | Maraslis | ............... | B60W 50/14 |
| 2019/0073902 A1* | 3/2019 | Indoh | ..................... | G08G 1/143 |
| 2019/0233009 A1* | 8/2019 | Joos | ................... | B62D 15/0285 |
| 2020/0074192 A1* | 3/2020 | Ogata | ..................... | H04N 7/18 |

FOREIGN PATENT DOCUMENTS

| | | |
|---|---|---|
| CN | 105539427 | 5/2016 |
| DE | 10 2008 050 6 | 4/2010 |

* cited by examiner

SMART PARKING ASSIST SYSTEM AND METHOD OF CONTROLLING THE SAME

CROSS REFERENCE TO RELATED APPLICATION

This application claims priority from Korean Patent Application No. 10-2017-0063586, filed on May 23, 2017, which is hereby incorporated by reference for all purposes as if fully set forth herein.

BACKGROUND OF THE INVENTION

1. Field of the Invention

The present disclosure relates to a smart parking assist system (SPAS) for assisting parking of a vehicle and a method of controlling the SPAS.

2. Description of the Prior Art

In general, when a vehicle is not being driven, a driver parks the vehicle in a parking lot. The parking is completed by rotating a steering wheel to move the vehicle toward a regularly formed parking space. An ordinary driver encounters more difficulty in driving when parking a vehicle than when driving the vehicle. Particularly, when a parking space is narrow or a driver's view is not clear, such as in a state in which the driver cannot recognize objects around the driver at night, the driver encounters more difficulty.

In order to alleviate the difficulties of the driver and assist the driver in parking, a smart parking assist system (SPAS) in which the vehicle sets a parking space and automatically controls parking to the set parking space has been researched, developed, and applied to vehicles.

The SPAS recognizes a parking space through a sensor installed in the vehicle and performs automatic parking by controlling steering, acceleration, and deceleration required for moving the vehicle to the recognized parking space.

The SPAS sets a parking space and uses a sensor, for example, an ultrasonic sensor, to detect obstacles located on a path leading to the parking space.

However, the sensor, such as the ultrasonic sensor, has a problem in that an obstacle having a predetermined height or less (e.g., a wheel stop, a curb, or a bump on the road) located within the parking space or on the path leading to the parking space cannot be detected.

When the automatic parking system (SPAS) controls automatic parking in the state in which the sensor cannot detect an obstacle having the predetermined height or less, the automatic parking cannot be completely controlled due to the obstacle having the predetermined height or less that is not detected.

For example, in perpendicular parking, a depth condition is set in a termination condition for terminating automatic parking. If the vehicle is caught by a wheel stop and does not reach a predetermined depth of a parking space, the automatic parking is not terminated and information thereon is not provided to a driver, such that the driver experiences great inconvenience. In parallel parking, when the vehicle performs the automatic parking control without detection of a curb or a bump on the road, wheels may be damaged by the bump on the road or a dangerous event, such as wheels of the vehicle going over the bump, may occur.

Accordingly, in the SPAS which controls automatic parking using a sensor, such as an ultrasonic sensor, a method is required for detecting an obstacle having a predetermined height or less that is located in the parking space or on a movement path to the parking space and normally performing automatic parking control when the obstacle having the predetermined height or less is detected.

SUMMARY OF THE INVENTION

The present disclosure is directed to provide a smart parking assist system (SPAS) capable of detecting an obstacle having a predetermined height or less that is located in a set parking space or on a movement path to the set parking space and is not detected by a sensor, and a method of controlling the SPAS.

The present disclosure is also directed to provide an SPAS allowing automatic parking control even when an object having a predetermined height or less that is not detected by a sensor in the process of automatic parking control is detected, and a method of controlling the SPAS.

To solve the foregoing problem, an embodiment provides an SPAS including: a parking space setting unit which sets a parking space for automatic parking of a vehicle on the basis of information acquired through a sensor installed in a vehicle; an automatic parking control unit which controls automatic parking of the vehicle in the set parking space; and an obstacle detection unit which detects an obstacle having a predetermined height or less that is located on a path for automatic parking of the vehicle on the basis of one or more pieces of information such as a target speed, a moving speed, and an engine driving torque of the vehicle in a process of controlling the automatic parking of the vehicle.

An embodiment provides method of controlling an SPAS, including: setting a parking space for automatic parking of a vehicle; controlling automatic parking of the vehicle in the set parking space; detecting an obstacle having a predetermined height or less which is located on a path for the automatic parking of the vehicle using at least one piece of information such as a target speed, a moving speed, and an engine driving torque of the vehicle; and adjusting the automatic parking control of the vehicle according to the location of the detected obstacle having the predetermined height or less when the obstacle having the predetermined height or less is detected.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, some embodiments of the present disclosure will be described in detail with reference to the accompanying illustrative drawings. In designating elements of the drawings by reference numerals, the same elements will be designated by the same reference numerals although the elements are shown in different drawings. Further, in the following description of the present disclosure, a detailed description of known functions and configurations incorporated herein will be omitted when it may make the subject matter of the present disclosure unclear.

In addition, terms such as first, second, A, B, (a), (b), and the like may be used herein when describing components of the present disclosure. The terms are merely used to distinguish one component from other components, and the property, order, sequence and the like of the corresponding component are not limited by the corresponding term. In the case that it is described that a certain structural element "is connected to," "is coupled to," or "is in contact with" another structural element, it should be interpreted that another structural element may "be connected to," "be coupled to," or "be in contact with" the structural elements as well as that the certain structural element is directly connected to or is in direct contact with another structural element.

In the present specification, the term "obstacle having a predetermined height or less" means an obstacle of a height less than a threshold height at which a sensor may detect a normal obstacle during the process of parking space searching or parking of a vehicle, and the obstacle having the predetermined height or less may include a fixed obstacle, such as a parking stopper, a curb, a bump on the road, and the like, but is not limited thereto, and may include a temporary obstacle having a height less than the threshold height, such as a stone, a can, and the like.

Therefore, in the present specification, the obstacle may refer to an obstacle having a predetermined height or less that an ultrasonic sensor or the like in a vehicle may not detect, and it will be described as an obstacle having a predetermined height or less. Meanwhile, when a case including both an obstacle having a predetermined height or more, such as another vehicle, a person, or the like, which may be detected through a sensor in a general vehicle, and an obstacle having the predetermined height or less is described, both obstacles may be described simply as obstacles and may be described as obstacles having the predetermined height or less, if needed. In this case, the predetermined height may be variously set according to a configuration position of the sensor configured in a vehicle, the performance of the sensor, and the like.

Figure 1:
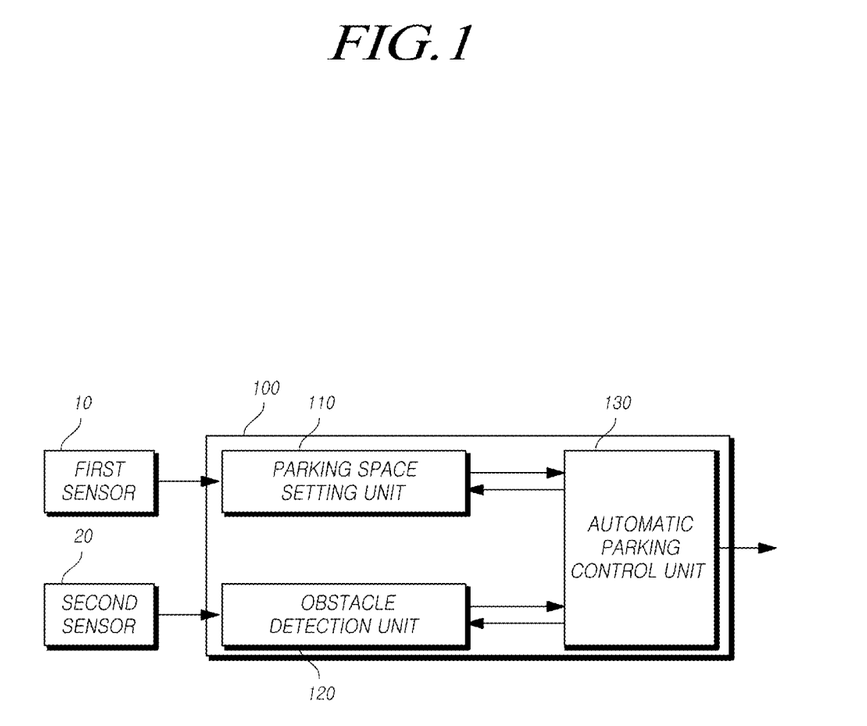
FIG. 1 is a diagram illustrating a configuration of a smart parking assist system (SPAS) according to embodiments of the present disclosure.

FIG. 1 is a diagram illustrating a configuration of a smart parking assist system (SPAS) 100 according to embodiments of the present disclosure.

Referring to FIG. 1, the SPAS 100 according to the embodiments includes a parking space setting unit 110 which sets a parking space for automatic parking of a vehicle, an obstacle detection unit 120 which detects an obstacle positioned on a path to the parking space, and an automatic parking control unit 130 which controls automatic parking on the basis of the detected obstacle.

The parking space setting unit 110 may set a parking space for automatic parking of a vehicle based on information obtained through a first sensor 10 installed in the vehicle when the SPAS 100 receives a control command for automatic parking.

In this case, the first sensor 10 may be a sensor to detect an obstacle such as another vehicle located outside the vehicle, and the first sensor 10 may include, for example, an ultrasonic sensor, a radar sensor, a camera, a Lidar sensor, and the like.

The first sensor 10 acquires information about an obstacle or the like detected in the vicinity of the sensor while the SPAS 100 searches for a parking space and transmits the information to the parking space setting unit 110.

The parking space setting unit 110 searches for a space where the vehicle may be automatically parked on the basis of the information acquired by the first sensor 10, and, when the parking space setting unit 110 finds any space for automatic parking of the vehicle, sets the found space as the parking space for automatic parking.

Then, the parking space setting unit 110 transmits information about the set parking space to the automatic parking control unit 130.

When the automatic parking control unit 130 receives the information about the completion of the parking space search and the set parking space from the parking space setting unit 110, the automatic parking control unit 130 may control the vehicle to be parked in the set parking space.

The automatic parking control unit 130 controls the vehicle to be located at a starting point for automatic parking control. The vehicle may be located at the starting point through driving control by the vehicle or manual control by a driver.

When the vehicle is located at the starting point for automatic parking control, the automatic parking control unit 130 controls the steering, acceleration, deceleration, braking, and the like of the vehicle in order to park the vehicle in the set parking space.

The vehicle is moved toward the set parking space through the vehicle control of the automatic parking control unit 130, thereby making the process of parking the vehicle more convenient for the driver.

An obstacle having a predetermined height or less (e.g., a wheel stop, a curb, a bump on the road, or the like) which is not detected by the first sensor 10 may be present in the set parking space or on the path to the set parking space.

When there is an obstacle having the predetermined height or less that is not detected by the first sensor 10, the automatic parking control unit 130 may not receive information about the obstacle having the predetermined height or less and thereby may fail to stably complete the automatic parking.

The present embodiments enable the vehicle to detect the obstacle having the predetermined height or less which is not detected by the first sensor 10, such as an ultrasonic sensor, in the process of automatic parking and perform automatic parking control through information other than the information acquired by the first sensor 10.

The obstacle detection unit 120 detects an obstacle having the predetermined height or less that is not detected by the first sensor 10 on the basis of information which is acquired through a second sensor 20 while the automatic parking control unit 130 performs the automatic parking control.

In this case, the second sensor 20 may be a sensor that does not detect an obstacle outside the vehicle but provides information about the vehicle itself, and may be, for example, a vehicle speed sensor, a wheel direction sensor, a torque sensor, an engine torque sensor, or the like.

That is, by using information acquired through the second sensor 20 which provides information about the vehicle itself, an obstacle having the predetermined height or less that is not detected by the first sensor 10 may be detected.

For example, the obstacle detection unit 120 may detect whether an obstacle having the predetermined height or less is present using at least one piece of information such as a target speed, a moving speed, and an engine driving torque of the vehicle.

In one example, the obstacle detection unit 120 may determine whether the obstacle having the predetermined height or less is present by comparing a target speed for automatic parking and a moving speed obtained through a speed sensor while the automatic parking control unit 130 performs the automatic parking control In this case, it may be determined that the obstacle having the predetermined height or less is present when a difference between the target speed and the moving speed exists and is maintained for more than a predetermined period (e.g., two seconds).

In another example, when a stationary state continues for more than a predetermined period of time in the state where a difference between the target speed and the moving speed exists and engine driving torque is generated by the difference, it may be determined that an obstacle having the predetermined height or less is present.

Alternatively, when movement of the vehicle detected by a wheel direction sensor of the vehicle is in a direction opposite to a moving direction in the state where the engine driving torque is generated in the moving direction of the vehicle due to the difference between the target speed and the moving speed, it may be determined that there is an obstacle having the predetermined height or less.

Therefore, according to the present embodiments, the obstacle detection unit 120 may be allowed to detect an obstacle having the predetermined height or less, which is located on the path to the parking space for automatic parking and may not be detected by the first sensor 10, on the basis of the information acquired through the second sensor 20.

That is, it is possible to stably perform automatic parking control even when an obstacle having the predetermined height or less is present on the path during a process of automatic parking control by allowing for detecting the obstacle having the predetermined height or less, such as a stopper, a curb, a bump on the road, or the like, which is not detected by the first sensor 10, which may be an ultrasonic sensor.

When the obstacle detection unit 120 detects an obstacle having the predetermined height or less that is located on the path to the parking space, the automatic parking control unit 130 may receive information about the detected obstacle having the predetermined height or less and perform automatic parking control based on the information on the detected obstacle.

When the obstacle detection unit 120 detects the obstacle having the predetermined height or less, the automatic parking control unit 130 adjusts an automatic parking control method based on the position of the detected obstacle having the predetermined height or less.

The automatic parking control unit 130 may determine whether the detected obstacle having the predetermined height or less is located in a first area or a second area and adjust the automatic parking control method based on the determination. The first area may be designated based on the parking space set by the parking space setting unit 110 and the second area may be designated based on the first area and the parking space.

That is, the first area may be an area designated based on the set parking space, and in one example, the automatic parking control unit 130 may designate a part of the set parking space which includes a parking termination point as the first area.

Alternatively, the automatic parking control unit 130 may designate an area of the set parking space within a predetermined distance from the parking termination point as the first area.

Alternatively, the automatic parking control unit 130 may variably designate the first area based on a length (total length) of the vehicle. For example, when the length of the vehicle is greater than or equal to a predetermined length, the size of the first area may be set to be larger relative to a reference area. In contrast, when the length of the vehicle is less than the predetermined length, the size of the first area may be set to be smaller relative to the reference area. This is because, since the parking termination point is variably set according to the length of the vehicle, a position of the obstacle having the predetermined height or less in the parking space of the vehicle may be accurately identified when the size of the first area, which is set to be within a predetermined distance from the parking termination point, is variably set.

Specifically, since the parking space of the vehicle is set such that a bump of the vehicle is arranged with a bump of a nearby vehicle when the vehicle is parked in reverse, the parking termination point of the vehicle relative to the other vehicles may be set closer toward the bump of the nearby vehicle when the length of the vehicle is less than a predetermined length. Accordingly, a gap distance between the parking termination point and an obstacle having the predetermined height or less, such as a stopper, may be reduced. Thus, in this case, the first area is set to be narrow.

Meanwhile, when the automatic parking control unit 130 performs perpendicular parking, a termination condition for terminating automatic parking may include a depth condition. In this case, based on the depth condition, an area of a depth greater than a predetermined depth (e.g., 50%) may be set as the first area.

In this case, the predetermined depth may be set on the basis of a full length of the vehicle that performs automatic parking. That is, as described above, the depth of the parking space may vary according to the length of the vehicle, and hence the first area may be variably set.

The automatic parking control unit 130 designates an area outside the first area designated based on the set parking space as the second area and, when an obstacle having the predetermined height or less is detected, determines whether the obstacle having the predetermined height or less is located in the first area or the second area.

When the obstacle having the predetermined height or less is detected in a state where the vehicle enters the first area, the automatic parking control unit 130 may determine that the obstacle having the predetermined height or less is located in the first area. In addition, when the obstacle having the predetermined height or less is detected before the vehicle enters the first area, the automatic parking control unit 130 may determine that the obstacle having the predetermined height or less is located in the second area.

Alternatively, when the obstacle having the predetermined height or less is detected in a state in which a predetermined proportion or greater of the vehicle has entered the set parking space, the automatic parking control unit 130 may determine that the obstacle having the predetermined height or less is located in the first area, and when an obstacle having the predetermined height or less is detected before the predetermined proportion or greater of the vehicle has entered the parking space, the automatic parking control unit 130 may determine that the obstacle having the predetermined height or less is located in the second area.

When the detected obstacle having the predetermined height or less is confirmed to be located in the first area, the automatic parking control unit 130 may determine that the detected obstacle having the predetermined height or less is a stopper or a curb located in the parking space.

Therefore, when the obstacle having the predetermined height or less located in the first area is detected, the automatic parking control unit 130 may perform automatic parking control by changing the parking termination condition.

For example, the parking termination point is changed to a point at which the obstacle having the predetermined height or less is detected and the vehicle is controlled based on the changed parking termination point to complete automatic parking.

When the obstacle having the predetermined height or less is confirmed to be located in the second area, the automatic parking control unit 130 may determine that the obstacle having the predetermined height or less is an obstacle or a bump on the road located outside the parking space.

In this case, since the automatic parking control unit 130 must perform automatic parking control such that the vehicle passes over the detected obstacle having the predetermined height or less, the automatic parking control unit 130 may perform a control for passing through the obstacle having the predetermined height or less.

For example, when the obstacle having the predetermined height or less located in the second area is detected, the automatic parking control unit 130 gradually increases an engine driving torque of the vehicle, which is in a stationary state due to the obstacle having the predetermined height or less.

When the vehicle passes over the obstacle having the predetermined height or less and starts moving, as the engine driving torque of the vehicle is gradually increased, the automatic parking control unit 130 performs automatic parking control to the set parking space.

Therefore, when the obstacle having the predetermined height or less located in the second area that is an area outside a parking space is detected, the vehicle is controlled to pass over the detected obstacle having the predetermined height or less and move toward the parking space, so that automatic parking may be stably completed even when the obstacle having the predetermined height or less is present on a movement path of the parking space.

That is, the present embodiments allow the obstacle having the predetermined height or less that is not detected by the first sensor 10, such as an ultrasonic sensor, to be detected on the basis of information acquired by the second sensor, such as a vehicle speed sensor, a wheel direction sensor, or the like.

In addition, the automatic parking control method is adjusted and performed on the basis of the area where the obstacle having the predetermined height or less is detected, thereby enabling the parking to be stably completed even when the obstacle having the predetermined height or less exists on the path to the parking space for automatic parking.

Figure 2:
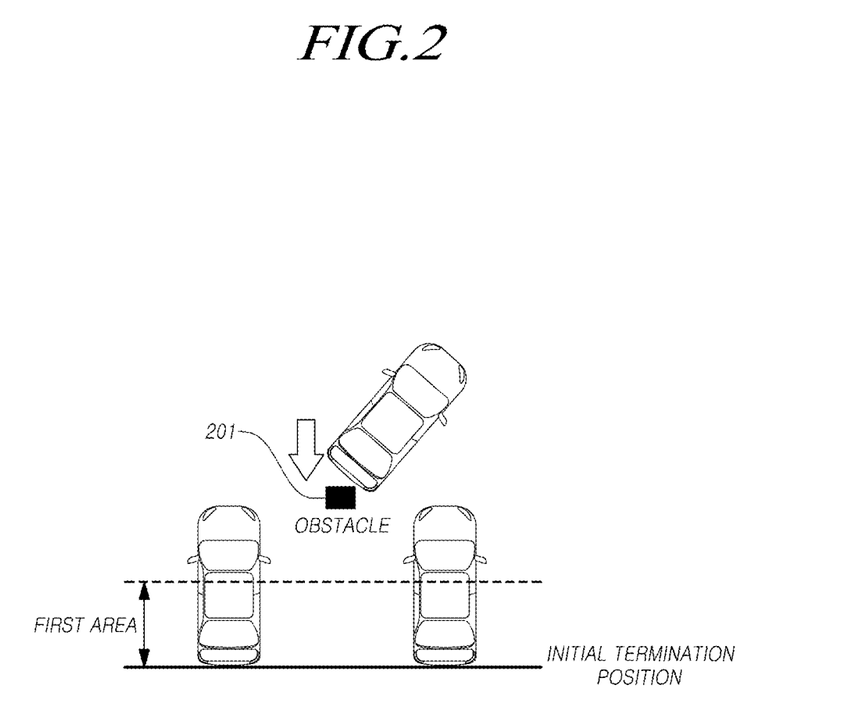
FIG. 2 is a diagram for describing automatic parking control according to the embodiments when the SPAS detects an obstacle located in an area outside a first area during parallel parking.
Figure 3A:
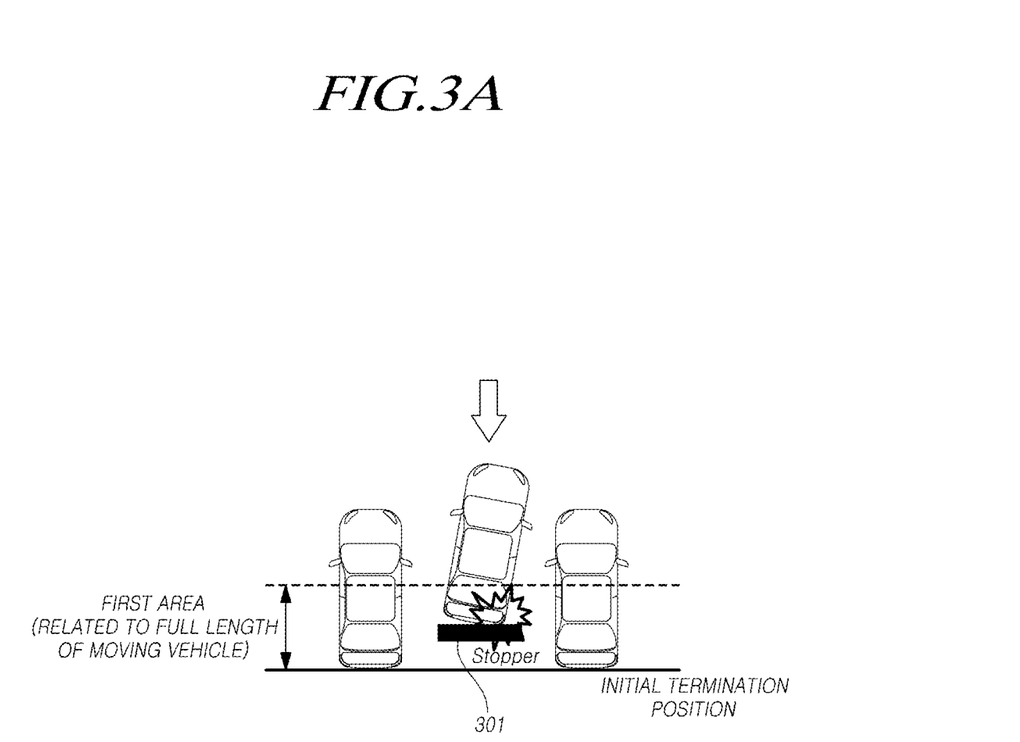
FIGS. 3A and 3B are diagrams for describing automatic parking control when the SPAS according to the embodiments detects an obstacle located in a first area during perpendicular parking.
Figure 3B:
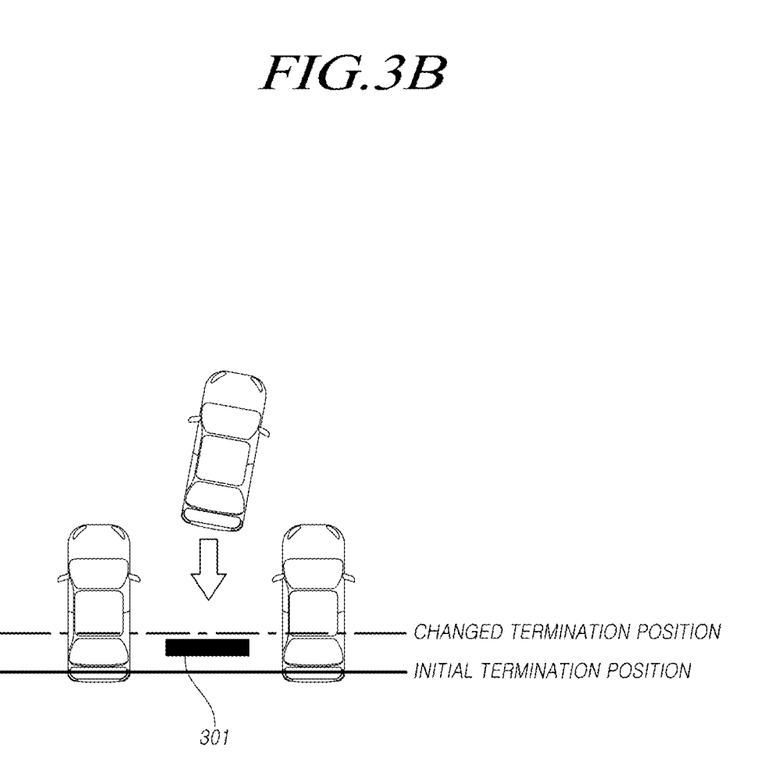

FIG. 2 and FIGS. 3A and 3B are diagrams illustrating examples of vehicle control according to the embodiments when an SPAS 100 performs perpendicular parking.

FIG. 2 is a diagram illustrating a case in which an obstacle having the predetermined height or less detected by an SPAS 100 is located in a second area that is an area outside a first area.

Referring to FIG. 2, the SPAS 100 searches for and sets a parking space, controls the vehicle on the basis of an initial termination position of the set parking space, and performs automatic parking.

In addition, a specific area is designated as a first area on the basis of the initial termination position of the set parking space, and the area outside the first area is designated as a second area.

While the vehicle is moving to the set parking space, the vehicle may be brought into a stationary state due to an obstacle 201 having the predetermined height or less.

The SPAS 100 detects an obstacle having the predetermined height or less on the basis of a target speed for automatic parking control of the vehicle, an actual moving speed, and an engine driving torque generated by a difference between the target speed and the moving speed.

Since the detected obstacle having the predetermined height or less is located in the second area, the SPAS 100 controls the vehicle to pass over the detected obstacle having the predetermined height or less by gradually increasing the engine driving torque of the vehicle in a stationary state.

Once the vehicle has passed over the detected obstacle having the predetermined height or less, the SPAS 100 continues to perform automatic parking by performing control for moving the vehicle to the set parking space.

FIGS. 3A and 3B are diagrams illustrating cases in which an obstacle having the predetermined height or less detected by the SPAS 100 is located in the first area.

Referring to FIG. 3A, an obstacle having the predetermined height or less that is not detected by a sensor is detected using at least one of a target speed, a moving speed, and an engine driving torque while the automatic parking of the vehicle is controlled.

When the SPAS 100 detects an obstacle having the predetermined height or less in a state in which the vehicle is positioned in the first area or when the SPAS 100 detects an obstacle having the predetermined height or less in a state in which a predetermined proportion or greater of the vehicle has entered the parking space, the SPAS 100 may determine that the detected obstacle having the predetermined height or less is located in the first area.

When it is confirmed that the obstacle having the predetermined height or less is located in the first area, the detected obstacle having the predetermined height or less may be a stopper, such as 301 shown in FIG. 3A, which is located in the parking space and may not be detected by a sensor.

Therefore, as shown in FIG. 3B, the SPAS 100 may change a parking termination point of the set parking space on the basis of a location of an obstacle having the predetermined height or less that has been detected at the initial termination position.

Then, the SPAS 100 may control automatic parking of the vehicle based on the changed termination position, thereby allowing for completion of automatic parking even when an obstacle having the predetermined height or less, such as a stopper, which is not detected by a sensor, exists in the parking space.

Figure 4:
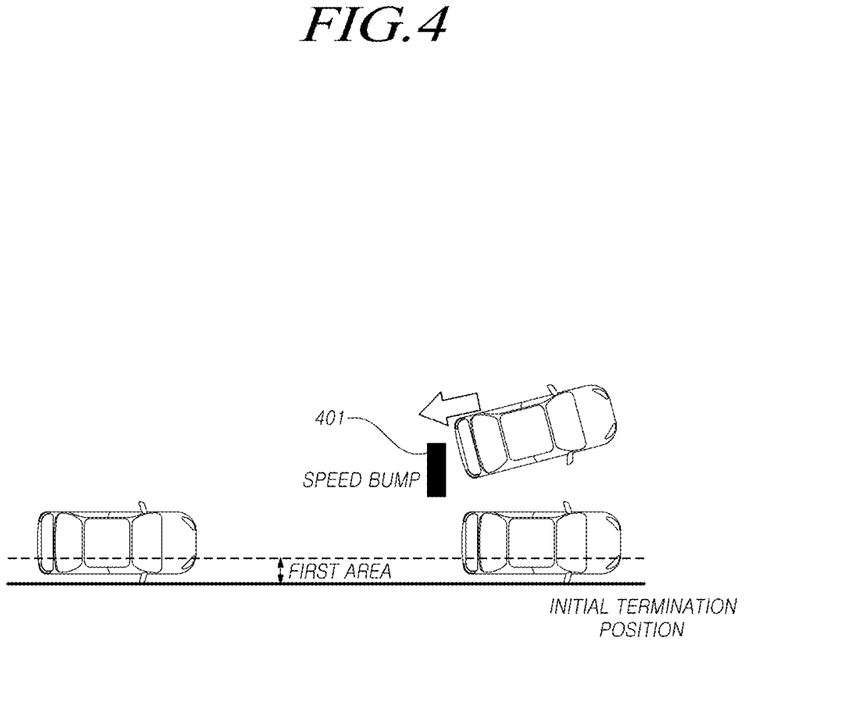
FIG. 4 is a diagram for describing automatic parking control when the SPAS according to the present embodiments detects an obstacle located in an area outside the first area during parallel parking.
Figure 5A:
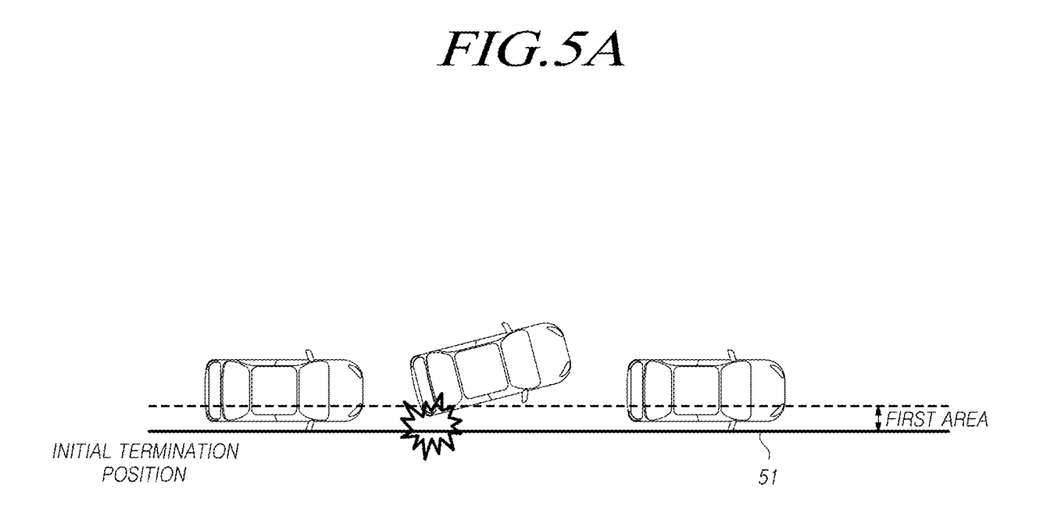
FIGS. 5A and 5B are diagrams for describing automatic parking control when the SPAS according to the embodiments detects an obstacle located in the first area during parallel parking.
Figure 5B:
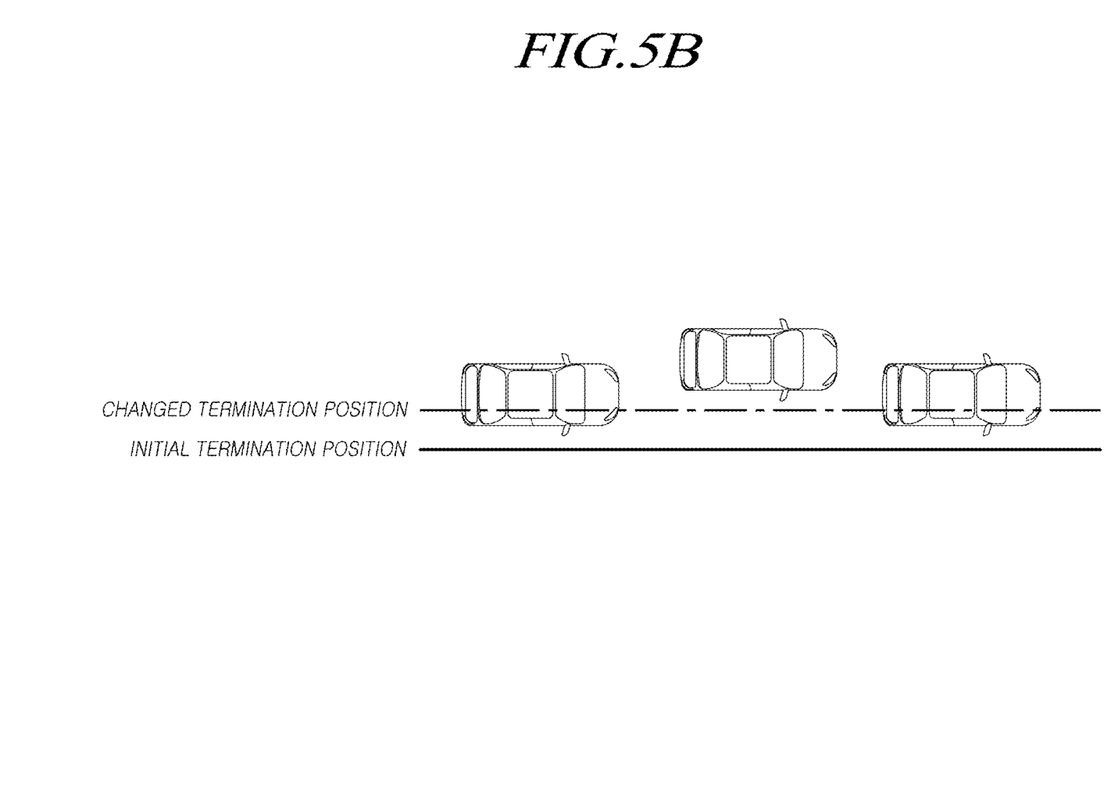

FIG. 4 and FIGS. 5A and 5B are diagrams illustrating examples of vehicle control in a case where an SPAS 100 according to the embodiments performs parallel parking.

FIG. 4 illustrates a case where an obstacle having the predetermined height or less detected by the SPAS 100 is located in a second area, wherein a speed bump or the like, such as 401, exists when a vehicle moves to a set parking space.

When the SPAS 100 detects an obstacle having the predetermined height or less while the vehicle is moving to a set parking space and it is confirmed that the detected obstacle is located in a second area, the SPAS 100 may determine that the detected obstacle is an obstacle having the predetermined height or less, such as a speed bump, existing on a path to the parking space.

Therefore, the SPAS 100 may control the vehicle to pass over the detected obstacle having the predetermined height or less by gradually increasing an engine driving torque of the vehicle.

FIGS. 5A and 5B illustrate examples of automatic parking control when an obstacle having the predetermined height or less, which is detected by the SPAS 100, is located in a first area.

Referring to FIG. 5A, when the SPAS 100 detects an obstacle having the predetermined height or less in a state in which the vehicle is positioned in the first area while the SPAS 100 is performing automatic parking control, the SPAS 100 determines that the obstacle having the predetermined height or less is located in the first area.

In the case of parallel parking of the vehicle, when the SPAS 100 detects the obstacle having the predetermined height or less located in the first area, the SPAS 100 may determine that the detected obstacle having the predetermined height or less is a curb or another obstacle having a predetermined height or more.

In this case, when the automatic parking control is performed based on an initial termination position, the vehicle may go over the curb and thereby wheels thereof may be damaged.

Thus, as shown in FIG. 5B, when the SPAS 100 detects an obstacle having the predetermined height or less in the first area in the course of automatic parking control for parallel parking, the SPAS 100 may change the initial termination position to another position and perform automatic parking control.

The changed termination position may be determined based on a position of the obstacle having the predetermined height or less detected by the SPAS 100.

That is, when the obstacle having the predetermined height or less is detected before the vehicle moving toward the initial termination position reaches the initial termination position, a point in front of a position of the detected obstacle having the predetermined height or less is set as a termination position. Then, automatic parking control is performed based on the changed termination position, thereby allowing the vehicle to complete parking without passing over the detected obstacle having the predetermined height or less.

Figure 6:
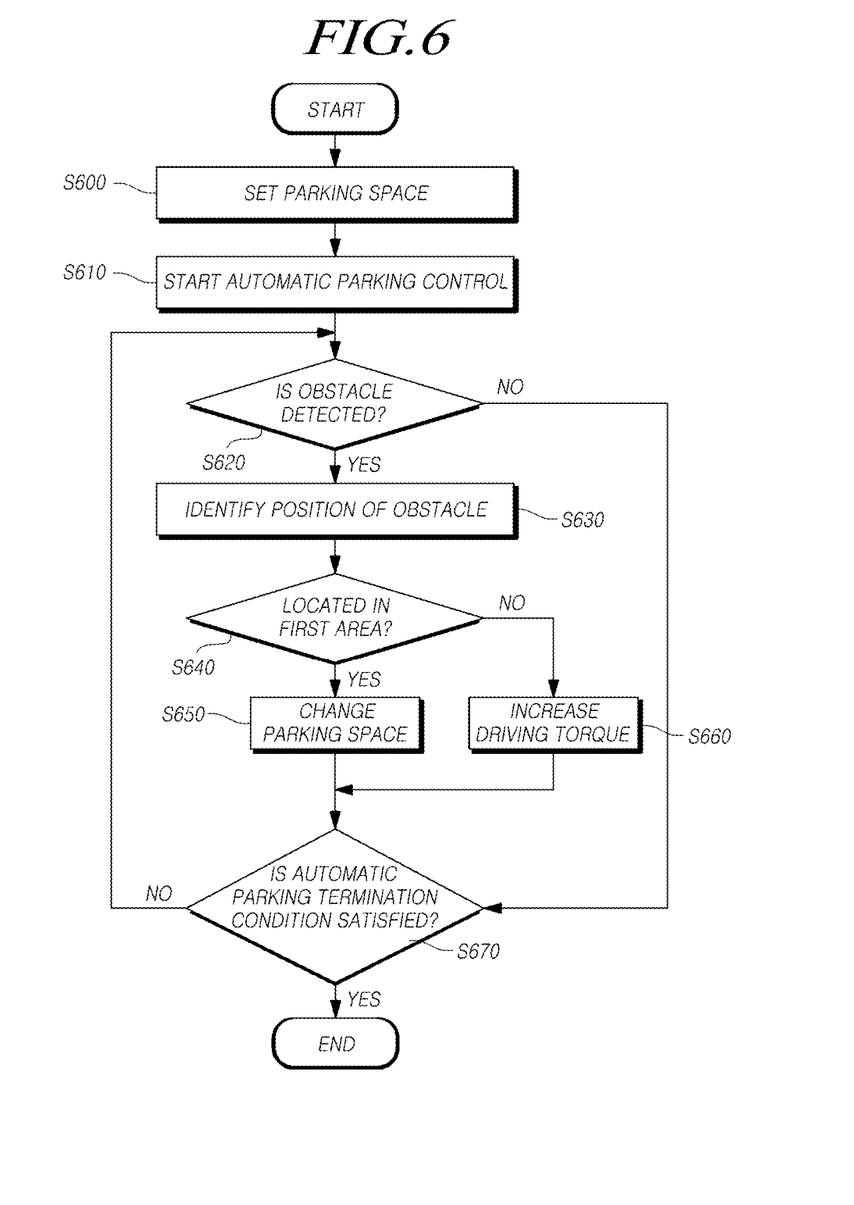
FIG. 6 is a flowchart illustrating a method of controlling an SPAS according to embodiments of the present disclosure.

FIG. 6 is a flowchart illustrating a process of a method of controlling an SPAS 100 according to embodiments of the present disclosure.

Referring to FIG. 6, when the SPAS 100 according to the embodiments receives an automatic parking command, the SPAS 100 sets a parking space for automatic parking by searching the surroundings of a vehicle (S600).

The SPAS 100 performs an automatic parking control by controlling movement of the vehicle toward the set parking space (S610).

The SPAS 100 detects an obstacle that is not detected by a sensor of the vehicle by using at least one of a target speed, a moving speed, and an engine driving torque of the vehicle while the vehicle is moved toward the set parking space (S620).

When the SPAS 100 detects an obstacle having a predetermined height or less, which is located on a path to the set parking space, the SPAS 100 identifies a position of the detected obstacle having the predetermined height or less (S630).

In this case, whether the obstacle having the predetermined height or less is present in a first area, which is set based on a parking termination point of the set parking space, or a second area, which is an area outside the first area, is determined (S640).

The first area may be a partial area of the set parking space including the parking termination point or may be an area within a specific distance from the parking termination point of the set parking space.

When it is determined that the detected obstacle having the predetermined height or less is located in the first area, it may be determined that the detected obstacle is a stopper or a curb in the parking space, and hence the SPAS 100 changes a parking termination point on the basis of a position of the detected obstacle having the predetermined height or less and performs automatic parking control (S650).

When it is confirmed that the detected obstacle having the predetermined height or less is located in the second area, it may be determined that the detected obstacle is a bump on the road on a path to the parking space, and thus the vehicle is controlled to pass over the obstacle having the predetermined height or less and move to the parking space by gradually increasing an engine driving torque of the vehicle (S660).

The SPAS 100 determines whether the position of the vehicle meets an automatic parking termination condition (S670), and when the automatic parking termination condition is met, the SPAS 100 terminates automatic parking control, and otherwise, controls automatic parking of the vehicle while continuing to detect an obstacle.

Therefore, according to the present embodiments, it is possible to detect an obstacle having the predetermined height or less, which is located on a movement path of the vehicle and is not detected by an ultrasonic sensor or the like of the vehicle, on the basis of information about a target speed, a moving speed, and an engine driving torque of the vehicle in the process of automatic parking control.

In addition, an automatic parking termination condition is changed according to a position of an obstacle having the predetermined height or less and automatic parking is completed or a vehicle is controlled to pass over the obstacle having the predetermined height or less so that it is possible to stably complete automatic parking even when the obstacle having the predetermined height or less, which is not detected by a sensor, exists on a path to a parking space for automatic parking.

As described above, the present disclosure determines the presence of an obstacle having the predetermined height or less using information rather than information detected by a sensor, thereby allowing for detection of an obstacle which is located on a movement path to a parking space and is not detected by the sensor.

According to the embodiments, when an obstacle having the predetermined height or less, which is not detected by a sensor, is detected, automatic parking control is performed differently according to the position of the detected obstacle, so that automatic parking can be stably completed even when the obstacle having the predetermined height or less exists on the movement path to the parking space.

The above embodiments of the present disclosure have been described only for illustrative purposes, and those skilled in the art will appreciate that various modifications and changes may be made thereto without departing from the scope and spirit of the disclosure. Therefore, the embodiments of the present disclosure are not intended to limit, but are intended to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

REFERENCE NUMERALS

100: SMART PARKING ASSIST SYSTEM
110: PARKING SPACE SETTING UNIT
120: OBSTACLE DETECTION UNIT
130: AUTOMATIC PARKING CONTROL UNIT
10: FIRST SENSOR
20: SECOND SENSOR

What is claimed is:

1. A smart parking assist system comprising:
a parking space setting unit which sets a parking space for automatic parking of a vehicle on the basis of information acquired through a sensor installed in a vehicle;
an automatic parking control unit which controls automatic parking of the vehicle in the set parking space; and
an obstacle detection unit which detects an obstacle having a predetermined height or less that is located on a path for automatic parking of the vehicle on the basis of one or more of a target speed, a moving speed, and an engine driving torque of the vehicle in a process of controlling the automatic parking of the vehicle,
wherein the automatic parking control unit is configured to:
when the obstacle having the predetermined height or less is detected in an area designated based on the set parking space, change a parking termination point of the set parking space and control the automatic parking of the vehicle, and
when the obstacle having the predetermined height or less is detected outside the area designated based on the set parking space, increase the engine driving torque of the vehicle and control the automatic parking of the vehicle based on the set parking space.

2. The smart parking assist system of claim 1, wherein the automatic parking control unit designates a partial area of the set parking space including a parking termination point as the area designated based on the set parking space.

3. The smart parking assist system of claim 1, wherein the automatic parking control unit designates an area within a predetermined distance from a parking termination point of the set parking space as the area designated based on the set parking space.

4. The smart parking assist system of claim 1, wherein the area designated based on the set parking space is set variably according to length information of the vehicle.

5. The smart parking assist system of claim 1, wherein, when the obstacle detection unit detects the obstacle having the predetermined height or less in a state in which the vehicle is positioned in the area designated based on the set parking space, the automatic parking control unit determines that the obstacle having the predetermined height or less is located in the area designated based on the set parking space.

6. The smart parking assist system of claim 1, wherein, when the obstacle detection unit detects the obstacle having the predetermined height or less in a state in which a predetermined proportion or more of the vehicle has entered the set parking space, the automatic parking control unit determines that the obstacle having the predetermined height or less is located in the area designated based on the set parking space.

7. The smart parking assist system of claim 1, wherein, when it is confirmed that the obstacle having the predetermined height or less is located outside the area designated based on the set parking space, the automatic parking control unit gradually increases an engine driving torque of the vehicle until the vehicle in a stationary state starts moving, and, once the vehicle starts moving, performs automatic parking control of the vehicle.

8. The smart parking assist system of claim 1, wherein when a difference between the target speed and the moving speed of the vehicle exists and the difference is maintained for a predetermined period of time or more, the obstacle detection unit detects that the obstacle having the predetermined height or less exists.

9. The smart parking assist system of claim 1, wherein the obstacle detection unit detects the obstacle on the basis of whether the vehicle is in a stationary state in a state in which an engine driving torque generated by a difference between the target speed and the moving speed of the vehicle exists.

10. The smart parking assist system of claim 1, wherein when it is detected that the obstacle having the predetermined height or less is located outside the area designated based on the set parking space, the automatic parking control unit increases the engine driving torque of the vehicle to control the automatic parking of the vehicle in the set parking space.

11. A method of controlling a smart parking assist system (SPAS), the method comprising:
setting a parking space for automatic parking of a vehicle;
controlling automatic parking of the vehicle in the set parking space;
detecting an obstacle having a predetermined height or less which is located on a path for the automatic parking of the vehicle using one or more of a target speed, a moving speed, and an engine driving torque of the vehicle;
when the obstacle having the predetermined height or less is detected in the area designated based on the set parking space, changing a parking termination point of the set parking space and controlling the automatic parking of the vehicle; and
when the obstacle having the predetermined height or less is detected outside the area designated based on the set parking space, increasing the engine driving torque of the vehicle and controlling the automatic parking of the vehicle based on the set parking space.

12. The method of claim 11, wherein the adjusting of the automatic parking control of the vehicle comprises controlling the automatic parking of the vehicle by changing the set parking space when the obstacle having the predetermined height or less is located in an area designated based on the set parking space, and controlling the automatic parking of the vehicle in the set parking space when the obstacle having the predetermined height or less is located outside the area designated based on the set parking space.

13. The method of claim 12, wherein the adjusting of the automatic parking of the vehicle comprises, when it is confirmed that the obstacle having the predetermined height or less is located outside the area designated based on the set parking space, gradually increasing the engine driving torque of the vehicle until the vehicle in a stationary state starts moving, and once the vehicle starts moving, performing the automatic parking control of the vehicle.

* * * * *